Patented Jan. 10, 1939

2,143,370

UNITED STATES PATENT OFFICE 2,143,370

PROCESS OF PREPARING 1,3-BUTYLENE-GLYCOL

Wilhelm Fitzky, Frankfort-on-the-Main, Germany, assignor to I. G. Farbenindustrie Aktiengesellschaft, Frankfort-on-the-Main, Germany No Drawing. Application February 19, 1938, Serial No. 191,459. In Germany February 27, 1937

9 Claims. (Cl. 260—635)

The present invention relates to a process of preparing 1,3-butylene-glycol.

I have found that 1,3-butylene-glycol may be obtained from propylene and formaldehyde-hydrate if these two substances are caused to react with each other under the catalytic effect of hydrogen halide with or without the addition of metal halides. The formation of the butylene glycol occurs according to the following equation:

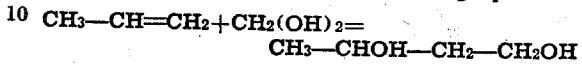

$$CH_3-CH=CH_2+CH_2(OH)_2=$$
$$CH_3-CHOH-CH_2-CH_2OH$$

The pressures applied during the reaction may be between about 20 and about 300 atmospheres. The reaction is carried out suitably at temperatures between about 50° C. and about 200° C.

The hydrogen halide is applied as a catalyst, i. e. less than 1 mol of hydrogen halide is added to 1 mol of propylene. There is suitably added about $\frac{1}{20}$ to about $\frac{1}{7}$ mol of hydrogen halide to 1 mol of propylene. As hydrogen halides there may be used hydrogen chloride or hydrogen bromide.

As metal halides which favorably influence the reaction there may be used halides of bivalent metals, especially of heavy metals. There may, for instance, be used zinc chloride, calcium chloride, magnesium chloride, mercury chloride.

The following examples serve to illustrate the invention but they are not intended to limit it thereto:

1. 1000 grams of zinc chloride and 200 grams of hydrogen chloride are dissolved in 4000 grams of formaldehyde solution of 30 per cent strength and 1.7 kilograms of propylene are added with application of pressure to this mixture which is contained in a stirring autoclave lined so as to be resistant to acid; the mixture is stirred for 5 hours at 70° C. The zinc is then precipitated by neutralizing the mixture with sodium carbonate and the butylene glycol is obtained by evaporating and distilling. A small quantity of chlor-3-butanol-1 is obtained as by-product. Under normal pressure the butylene glycol boils at 204° C. and forms a liquid clear as water which may readily be mixed with water.

2. An aqueous solution of 30 per cent strength of formaldehyde containing about 5 per cent of hydrogen chloride is introduced from above into a reaction column and is caused to react at 100° C. and a pressure of about 40 atmospheres with propylene gas flowing in from below. The butylene glycol solution leaving the column at the bottom part is further treated as described in Example 1.

I claim:

1. The process of preparing 1,3-butylene-glycol which comprises causing formaldehyde-hydrate to act upon propylene under superatmospheric pressure in the presence of a hydrogen halide as a catalyst.

2. The process of preparing 1,3-butylene-glycol which comprises causing formaldehyde to act upon propylene under superatmospheric pressure in the presence of water and of a hydrogen halide as a catalyst.

3. The process of preparing 1,3-butylene-glycol which comprises causing formaldehyde to act upon propylene under superatmospheric pressure in the presence of water, a hydrogen halide and a halide of a bivalent metal as catalysts.

4. The process of preparing 1,3-butylene-glycol which comprises causing formaldehyde to act upon propylene at a pressure between about 20 and about 300 atmospheres in the presence of water and of a hydrogen halide as a catalyst.

5. The process of preparing 1,3-butylene-glycol which comprises causing formaldehyde to act upon propylene at a pressure between about 20 and about 300 atmospheres and at a temperature between about 50° C. and about 200° C. in the presence of water and of a hydrogen halide as a catalyst.

6. The process of preparing 1,3-butylene-glycol which comprises causing formaldehyde to act upon propylene at a pressure between about 20 and about 300 atmospheres and at a temperature between about 50° C. and about 200° C. in the presence of water and of hydrogen chloride as a catalyst.

7. The process of preparing 1,3-butylene-glycol which comprises causing formaldehyde to act upon propylene at a pressure between about 20 and 300 atmospheres and at a temperature between about 50° C. and about 200° C. in the presence of water and of hydrogen chloride in an amount of about $\frac{1}{20}$ mol to about $\frac{1}{7}$ mol calculated upon 1 mol of propylene.

8. The process of preparing 1,3-butylene-glycol which comprises causing an aqueous solution of formaldehyde to act upon propylene at a pressure between about 20 and about 300 atmospheres and at a temperature between about 50° C. and about 200° C. in the presence of hydrogen chloride in an amount of about $\frac{1}{20}$ mol to about $\frac{1}{7}$ mol calculated upon 1 mol of propylene.

9. The process of preparing 1,3-butylene-glycol which comprises causing an aqueous solution of formaldehyde to act upon propylene at a pressure between about 20 and about 300 atmospheres and at a temperature between about 50° C. and about 200° C. in the presence of zinc chloride and of hydrogen chloride in an amount of about $\frac{1}{20}$ mol to about $\frac{1}{7}$ mol calculated upon 1 mol of propylene.

WILHELM FITZKY.